(12) United States Patent
Keefe et al.

(10) Patent No.: US 12,242,963 B2
(45) Date of Patent: Mar. 4, 2025

(54) USER-IN-THE-LOOP OBJECT DETECTION AND CLASSIFICATION SYSTEMS AND METHODS

(71) Applicant: Teledyne FLIR Defense, Inc., Thousand Oaks, CA (US)

(72) Inventors: A. Peter Keefe, Chelmsford, MA (US); James Leonard Nute, Chelmsford, MA (US)

(73) Assignee: Teledyne FLIR Defense, Inc., Thousand Oaks, CA (US)

( * ) Notice: Subject to any disclaimer, the term of this patent is extended or adjusted under 35 U.S.C. 154(b) by 231 days.

(21) Appl. No.: 17/957,256

(22) Filed: Sep. 30, 2022

(65) Prior Publication Data

US 2023/0028196 A1    Jan. 26, 2023

Related U.S. Application Data

(63) Continuation of application No. PCT/US2021/025249, filed on Mar. 31, 2021.
(Continued)

(51) Int. Cl.
*G06N 3/08* (2023.01)
*G01S 7/497* (2006.01)
(Continued)

(52) U.S. Cl.
CPC ............... *G06N 3/08* (2013.01); *G01S 7/497* (2013.01); *G01S 17/66* (2013.01); *G06V 10/454* (2022.01); *G06V 20/00* (2022.01)

(58) Field of Classification Search
CPC .......... G06N 3/08; G06N 3/045; G01S 7/497; G01S 7/66; G06V 10/454; G06V 20/00;
(Continued)

(56) References Cited

U.S. PATENT DOCUMENTS 8,364,309 B1    1/2013  Bailey
2017/0124476 A1    5/2017  Levinson et al.
(Continued)

OTHER PUBLICATIONS

Moteir et al., "Urban Intelligent Navigator for Drone Using Convolutional Neural Network (CNN)," 2019 International Conference on Smart Applications, Communications and Networking (SmartNets), Dec. 2019, pp. 1-4, IEEE Sharm El Sheikh, Egypt, Abstract.

*Primary Examiner* — Tarifur R Chowdhury
*Assistant Examiner* — Carlos Perez-Guzman
(74) *Attorney, Agent, or Firm* — Haynes and Boone, LLP (57) ABSTRACT

A detection device is adapted to traverse a search area and generate sensor data associated with an object that may be present in the search area, the detection device comprising a first logic device configured to detect and classify the object in the sensor data, communicate object detection information to a control system when the detection device is within a range of communications of the control system, and generate and store object analysis information for a user of the control system when the detection device is not in communication with the control system. A control system facilitates user monitoring and/or control of the detection device during operation and to access the stored object analysis information. The object analysis information is provided in an interactive display to facilitate user detection and classification of the detected object by the user to update the detection information, trained object classifier, and training dataset.

20 Claims, 8 Drawing Sheets

Related U.S. Application Data

(60) Provisional application No. 63/003,154, filed on Mar. 31, 2020.

(51) Int. Cl.
  *G01S 17/66* (2006.01)
  *G06V 10/44* (2022.01)
  *G06V 20/00* (2022.01)

(58) Field of Classification Search
  CPC ... G06F 18/214; G06F 18/24133; G06F 18/41
  See application file for complete search history.

(56) References Cited

U.S. PATENT DOCUMENTS

| | | |
|---|---|---|
| 2017/0291301 A1 | 10/2017 | Ibarz Gabardos et al. |
| 2018/0147721 A1 | 5/2018 | Griffin et al. |
| 2018/0330238 A1 | 11/2018 | Luciw et al. |
| 2019/0026597 A1 | 1/2019 | Zeng et al. |
| 2021/0227126 A1* | 7/2021 | Se .................... G06V 10/454 |

* cited by examiner

USER-IN-THE-LOOP OBJECT DETECTION AND CLASSIFICATION SYSTEMS AND METHODS

CROSS-REFERENCE TO RELATED APPLICATIONS

This application is a continuation of International Patent Application No. PCT/US2021/025249 filed Mar. 31, 2021 and entitled "USER-IN-THE-LOOP OBJECT DETECTION AND CLASSIFICATION SYSTEMS AND METHODS," which claims priority to and the benefit of U.S. Provisional Patent Application No. 63/003,154 filed Mar. 31, 2020 and entitled "USER-IN-THE-LOOP OBJECT DETECTION AND CLASSIFICATION SYSTEMS AND METHODS," all of which are hereby incorporated by reference in their entirety.

TECHNICAL FIELD

One or more embodiments of the present disclosure relate generally to machine learning systems and, and more particularly, for example, to user-controlled machine learning systems and methods for.

BACKGROUND

In the field of image processing, there is an ongoing need for efficient and reliable ways to detect and classify objects of interest within a field of view (e.g., a scene) of an imaging device. Traditional "smart cameras" combine a machine vision imaging component and a single board computer running rules-based image processing software. These systems are used for simple problems like barcode reading or identifying a particular feature of a known object.

Machine leaning systems have been implemented to provide more complex image analysis. In one approach, various images of an object of interest are collected into a training dataset for training a neural network to classify the object. The training images may be generated with a camera capturing images of the object at various angles and in various setting. A training dataset often includes thousands of images for each object classification, and can be time consuming, expensive and burdensome to produce and update. The trained neural network may be loaded on a server system that receives and classifies images from imaging devices on a network. In some implementations, the trained neural network may be loaded on an imaging system.

Simplified machine vision and image classification systems are available, but such systems are not capable of running robust trained neural networks and are difficult to adapt to various end-use scenarios. In practical implementations, limitations on memory, processing, communications, and other system resources often lead system designers to produce classification systems directed to particular tasks. A neural network may be trained for particular classification tasks and implemented to allow for real time operation within the constraints of the system. For example, in an environment where an unmanned ground vehicle (UGV) performs object detection while in communication with a control station, a lack of communications between the UGV and control station may lead to inaccurate detection results.

In view of the foregoing, there is a continued need for improved object detection and classification solutions.

SUMMARY

Various systems and methods are provided for implementing trained neural networks, with user-in-the-loop functionality. In some embodiments, a system comprises an unmanned vehicle adapted to traverse a search area and generate sensor data associated with an object that may be present in the search area, the unmanned vehicle comprising a first logic device configured to detect and classify the object in the sensor data, communicate object detection information to a control system when the unmanned vehicle is within a range of communications of the control system, and generate and store object analysis information for a user of the control system when the unmanned vehicle is not in communication with the control system. The object analysis information is generated to facilitate user detection and classification of the detected object.

In various embodiments, the unmanned vehicle comprises an unmanned ground vehicle (UGV), and unmanned aerial vehicle (UAV), and/or an unmanned marine vehicle (UMV), and further comprises a sensor configured to generate the sensor data, the sensor comprising a visible light image sensor, an infrared image sensor, a radar sensor, and/or a Lidar sensor. The first logic device may be further configured to execute a trained neural network configured to receive a portion of the sensor data and output a location of an object in the sensor data and a classification for the located object, wherein the trained neural network is configured to generate a confidence factor associated with the classification. In addition, the first logic device may be further configured to construct a map based on generated sensor data.

The system may also include a control system configured to facilitate user monitoring and/or control of the unmanned vehicle during operation including a display screen, a user interface, and a second logic device configured to receive real-time communications from the unmanned vehicle relating to detected objects, access the stored object analysis information during a period when the unmanned vehicle is in communication range of the control system, display at least a portion of the object analysis information for the user to facilitate detection and classification of the detected object by the user, and update object detection information in accordance with user input. The second logic device may be further configured to generate a training data sample from the updated object detection information for use in training an object classifier; retrain the object classifier using a dataset that includes the training data sample; and determine whether to replace a trained object classifier with the retrained object classifier, the determination based at least in part on a comparative accuracy of the trained object classifier and the retrained object classifier in classifying a test dataset. In addition, the second logic device may be further configured to, if it is determined to replace the trained object classifier with the retrained object classifier, download the retrained object classifier to the unmanned vehicle to replace the trained object classifier; and add the training data sample to the training dataset.

Other embodiments of systems and methods are also covered by the present disclosure.

The scope of the disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to object detection and classification. Embodiments include a system where data describing objects detected by a sensor system are sent to a user to approve and/or update various parameters, such as detected type, position, color, and/or other parameters. The system may be configured to record and play back data that was captured by the sensor system during the detection of the object, providing the control station user a view of what led up to the detection of the object and the ability to supplement or correct the object information (e.g., object classification, object position, etc.). The user interface may include a real-time virtual reality, augmented reality or other three-dimensional interface of the 3D map and other telemetry data from the UGV to make it provide the user with additional views to make it easier for the user to approve/refine the collected sensor data.

In various embodiments, a device captures sensor data from an environment and performs object detection, classification, localization and/or other processing on the captured sensor data. For example, a system may include an unmanned ground vehicle (UGV) configured to sense, classify and locate objects in its environment, while in wireless communication with a control station that facilitates additional processing and control. The UGV may include a runtime object detection and classification module that is limited by the runtime environment, and may produce false positives, misclassifications, and other errors that are undesirable for a given application. In operation, a user at the control station may be able to correction the data in real time. When there is lack of communications between the UGV and the control station, it may be desirable and convenient, to later review and verify/correct the runtime detections of the UGV.

Inaccuracies in the detections could lead to errors in the positioning of detected objects in three-dimensional (3D) space. To correct these errors, it may be desirable to have a user of the control station reposition the object within the two-dimensional (2D) and/or 3D map. To do this, the UGV is configured to record data about the detected object (e.g., data sufficient to understand what a detected object looks like visually) and details about the position of the object. In some embodiments, the system is configured to capture the visible images of the object, but also position and location information from one or more sensors, such as point cloud data from a light detection and ranging (Lidar) system, real-world coordinate information from a global positioning satellite (GPS) system, and/or other data from other sensor systems, that applies to the scenario.

The object detection systems and methods described herein may be used in various object detection contexts. For example, the system may include a robot (e.g., a UGV) that senses aspects of an environment, detects objects in the sensed data, and stores related object data in a database and/or map of those object detections. The data may be first directed to a control station where a user may approve and/or augment those detections before forwarding to the database.

In some embodiments, the detection of objects is performed using a trained artificial intelligence system, such as a convolutional neural network (CNN) classifier, that outputs a location of a box around detected objects in a captured image. In some cases, further detail may be desired, such as an understanding of the location of a reference point on the detected object. The system's described herein may be configured to create an augmentation to the data created by the artificial intelligence system, providing the user with an interface to verify or correct a particular point of interest and then transform the data into the correct reference frame. The present disclosure may be used with an artificial intelligence, machine learning, neural network or similar system that identifies an object type and/or class and the object position. In various embodiments, the classifier also outputs a probability indicating a confidence factor in the classification. The system is adaptable to a variety of machine learning frameworks, even systems that produce a large amount of error in the classification, provided the system produces a reasonable starting point for the user to make the correction.

Figure 1:
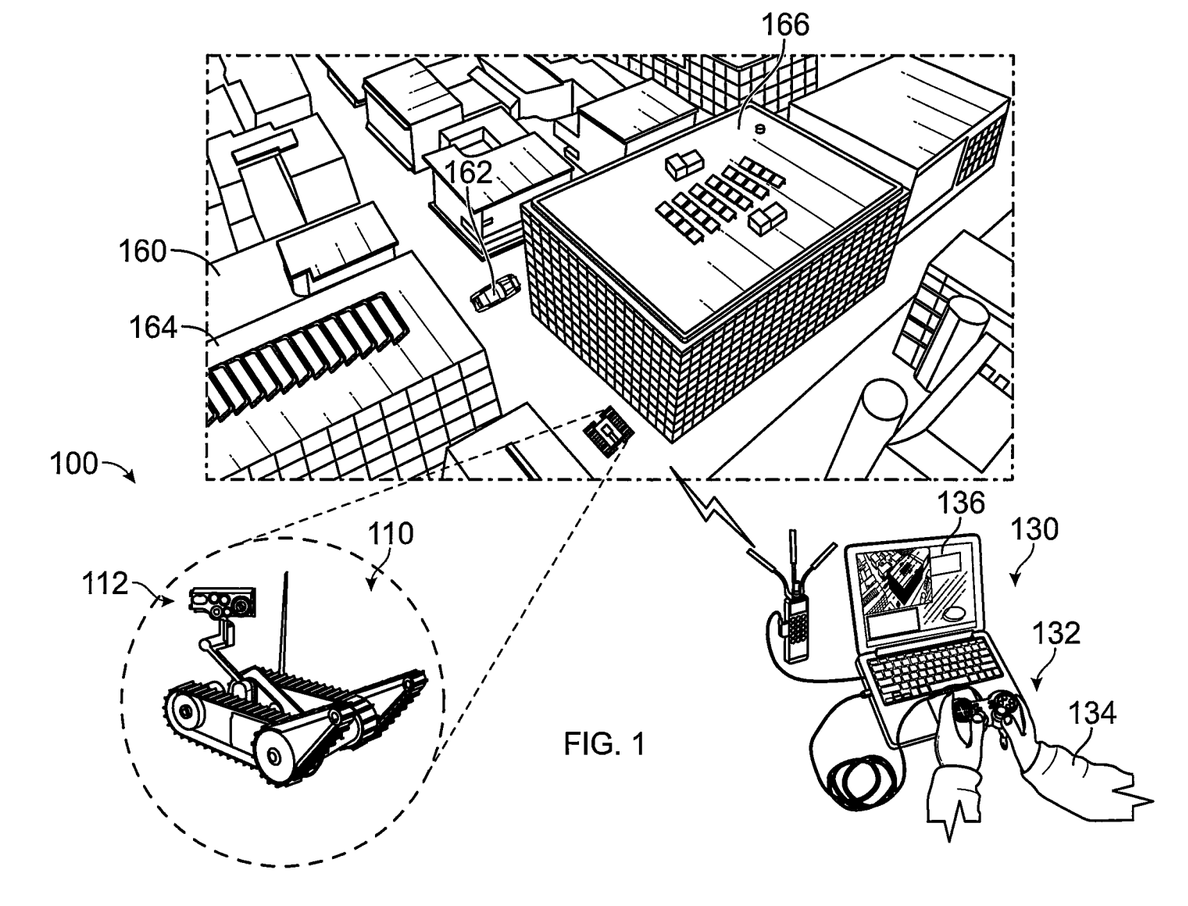
FIG. 1 illustrates an example object detection system, in accordance with one or more embodiments.

Referring to FIG. 1, an example object detection system 100 will now be described, in accordance with one or more embodiments. A robot 110 with imaging and depth sensors 112 is controlled by a controller 130 with user interface 132 with an interactive display 136 that commands the robot 110 to explore autonomously, such as through a real-world location 160. While the robot 110 is exploring autonomously, it may lose communication and the with the controller 130 for a period of time (e.g., due to distance, obstruction, interference, etc.), during which the controller 130 receives no or partial information from the robot 110. While the robot 110 is out of range of the controller 130, it continues to collect data about the location 160. In some embodiments, the robot 110 is configured to detect an object of interest (e.g., car 162) and place that object in a map that the robot 110 is generating and storing in memory. The robot 110 may continue searching for and detecting objects of interest, such as building 164 and building 166, before returning to within communications range of the controller 130.

After the controller 130 re-establishes communications with the robot 110, the controller 130 accessed the updated map, which includes the three new objects that have been detected, including their positions, type, and confidence level as determined by the robot 110. In some embodiments, a real-time VR view of the 3D map and other telemetry from the robot 110 is utilized to make it easier for the user 134 to approve/refine using the controller 130. The user input may be used to re-train both the detections and the positioning of the objects and then that updated model used on the next detection cycle.

Figure 2:
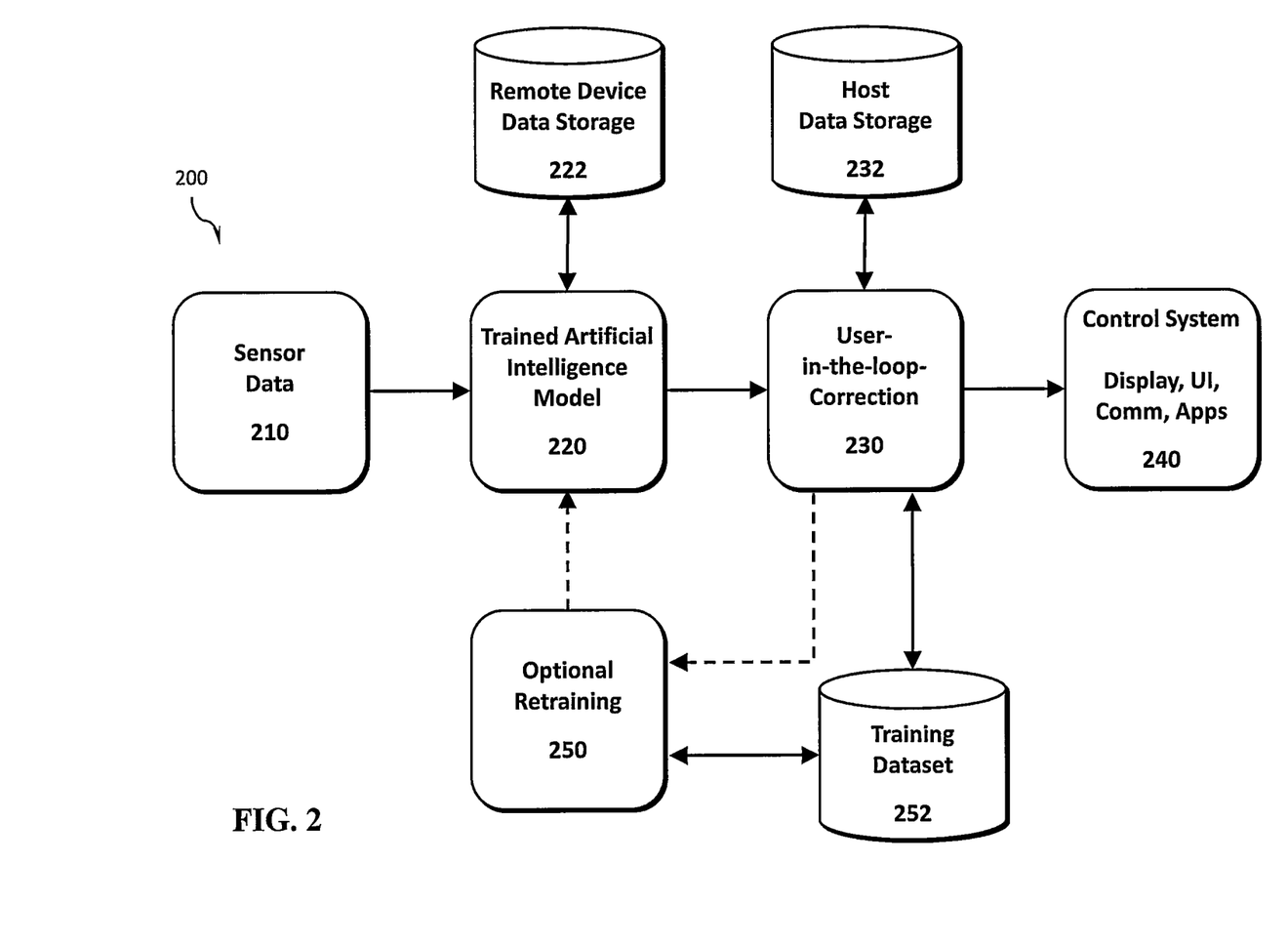
FIG. 2 illustrates an example operation of a user-in-the-loop object detection system, in accordance with one or more embodiments.

The operation of a user-in-the loop object detection system will now be described in further detail with reference to FIG. 2, which illustrates an example system operation in accordance with one or more embodiments. A process 200 receives sensor data 210 from one or more sensor systems of a remote device, such as a UGV, an unmanned aerial vehicle (UAV), unmanned marine vehicle, or other remote device that includes a sensor for acquiring environmental data, and a processing component for detecting objects in the sensor data. The remote device processing components include a trained artificial intelligence model 220 configured to receive sensor data and output detected objects, object locations, object classifications, and/or a classification confidence factor. In some embodiments, the trained artificial intelligence model 220 includes a convolutional neural network trained on a training dataset 252 to detect, classify and locate objects in the sensor data. The trained artificial intelligence model 220 may further include sensor data processing components for one or more of the sensors such as image processing algorithms, radar data processing algorithms, Lidar processing algorithms, and/or other sensor data processing algorithms.

The remote device is configured to store object data, map data and/or user-in-the-loop data in a remote device data storage 222. In one embodiment, the remote device is configured to detect when communications with the controller system are lost and store data for use in a user-in-the-loop correction process. This data may include an identification of object detections and data acquired or produced during the period without communications, addition data collection such pictures and video of the scene preceding, during and after detection, and other data. In other embodiments, the remote device is configured to store the user-in-the-loop data during operation, even when communication with the controller system is active.

After the remote device is back in communication with the controller system, which may include returning to a home location, the user-in-the-loop-correction process 230 can access and the data stored on the remote device data storage 222. The user-in-the-loop-correction process 230, identifies for the user objects detected and classified during periods where communications were lost, and provides an interface allowing the user to walk through the detection and make corrections to the classification, location of the object, a point of interest on the object, and/or other collected data. The user interface may include a VR/AR interface allowing the user to explore the captured data and map to aid in the user corrections. The user interface may include a display and control over video of the detection, including forward, reverse, pause, zoom, and other video controls as known in the art. The user interface may also display the map constructed by the remote device. The controller stores the data in a host data storage 232, which may include one or more of a local storage device, a networked storage device, or a cloud storage device.

After corrections are made by the user to the objects detected during periods without and/or with communications between the remote device and the controller system, the corrected object classification information may be formatted for use in the training dataset 252. In an optional retaining process 250, the control system is configured to retrain the artificial intelligence model 220 using the updated training dataset 252 and replace the trained artificial intelligence model 220 if certain criteria are met. In one embodiment, the performance of the updated artificial intelligence training model is tested using a test dataset, and the results are compared against the performance of the current trained artificial intelligence model 220 using the same dataset. The system may be configured, for example, to replace the trained artificial intelligence model 220 if the performance of the updated model is above a certain threshold factor. In the illustrated embodiment, the user accesses the system using a control system 240, that includes a display, user interface, communications components, data processing applications, and user applications.

Figure 3:
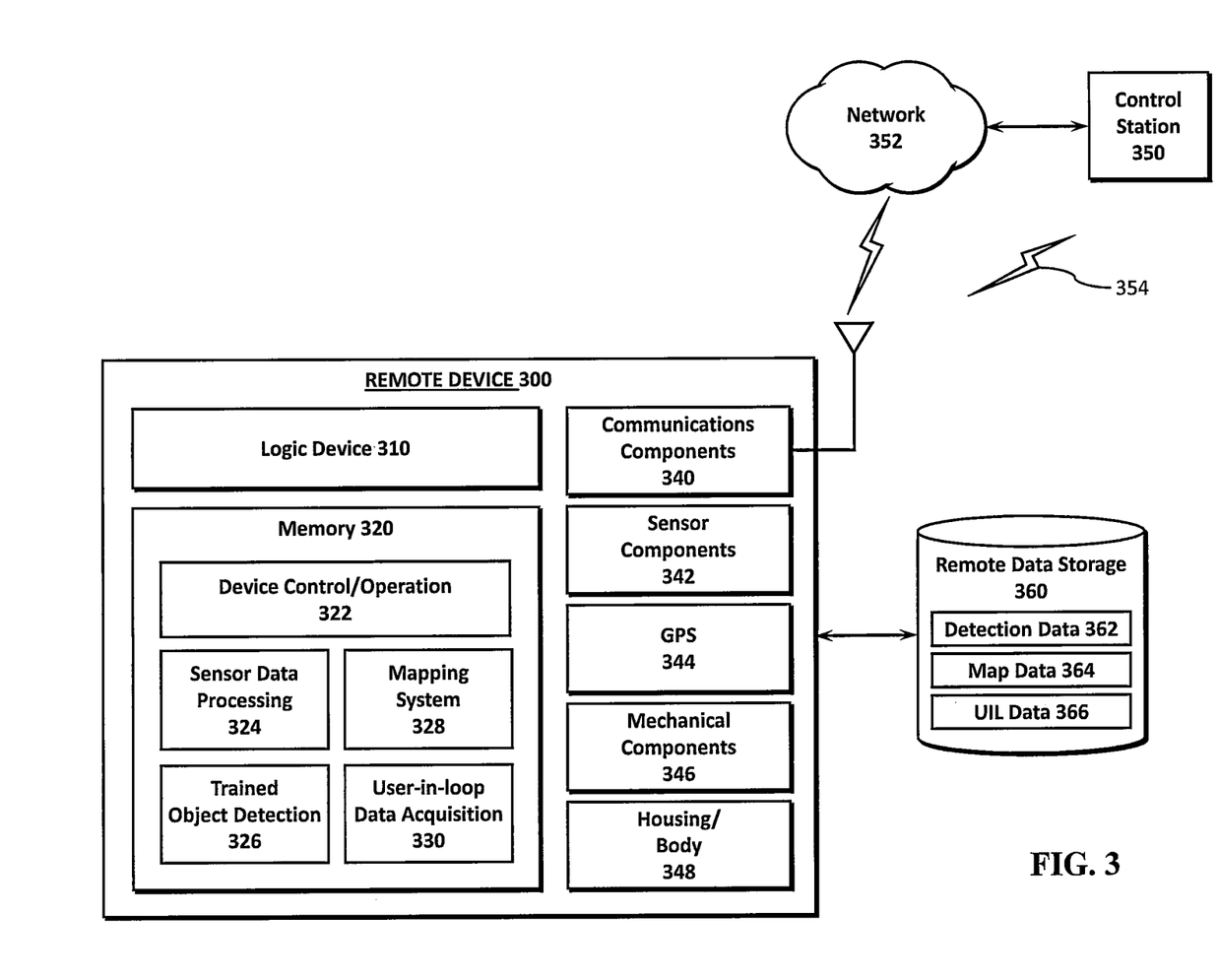
FIG. 3 illustrates an example remote device configured for user-in-the-loop processing of object detection data, in accordance with one or more embodiments.

An example embodiment of a remote device will now be described with reference to FIG. 3. A remote device 300 is configured to communicate with a control station 350 over a wireless connection 354. As illustrated, the remote device 300 is an unmanned vehicle, such as a UGV, UAV or UMV or other device configured to travel and collect environmental data under control of user at a control station. The user may control, interact and/or observe the activity of the remote device 300 through the control station 350.

The remote device 300 is generally configured to capture and analyze sensor data to detect and classify objects. The remote device 300 includes a logic device 310, a memory 320, communications components 340, sensor components 342, GPS 344, mechanical components 346, and a vehicle housing/body.

Logic device 310 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), a graphics processing unit and/or any other appropriate combination of processing device and/or memory configured to execute instructions to perform any of the various operations described herein. Logic device 310 is adapted to interface and communicate with components 320, 330, 340, and 350 to perform method and processing steps as described herein.

It should be appreciated that processing operations and/or instructions may be integrated in software and/or hardware as part of logic device 310, or code (e.g., software or configuration data) which may be stored in memory 320. Embodiments of processing operations and/or instructions disclosed herein may be stored by a machine-readable medium in a non-transitory manner (e.g., a memory, a hard drive, a compact disk, a digital video disk, or a flash memory) to be executed by a computer (e.g., logic or processor-based system) to perform various methods disclosed herein.

Memory 320 includes, in one embodiment, one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory.

In various embodiments, logic device 310 is adapted to execute software stored in memory 320 and/or a machine-readable medium to perform various methods, processes, and operations in a manner as described herein. The software includes device control and operation instructions 322 configured to control the operation of the remote device, such as autonomous driving, data acquisition, communications and control of various mechanical components 346 of the remote device 300. The software further includes sensor data processing logic 324 configured to receive captured data from one or more sensor components 342 and process the received data for further use by the remote device 300. The software further includes trained object detection models 326 configured to receive processed sensor data and output object detection and classification information that may include object location and a confidence factor for the classification.

The memory 320 also stores software instructions for execution by the logic device 310 for mapping the environment and user-in-loop data acquisition. The mapping system 328 is configured to use the sensor data, object detection and classification information, GPS data from GPS 344, and other available information to construction a map of the sensed environment as the remote device 300 traverses the area. The user-in-loop data acquisition logic 330 is configured to detect whether the remote device 300 has lost communications with control station 350 and store additional data, such as video captured before, during and after object detection, other sensor data relevant to object classification, GPS location data, and other information to aid the user of the control station 350 in visually confirming and/or correcting object detection and classification information. The memory 320 is further configured to store object detection data 362, map data 364 and user-in-the-loop data 366. In some embodiments, the remote device 300 includes a separate remote data storage 360.

The sensor components 342 include a plurality of sensors configured to sense and capture information about the surrounding environment. The sensor components 342 include one or more image sensors for capturing visible spectrum and/or infrared spectrum images of a scene as digital data. Infrared sensors may include a plurality of infrared sensors (e.g., infrared detectors) implemented in an array or other fashion on a substrate. For example, in one embodiment, infrared sensors may be implemented as a focal plane array (FPA). Infrared sensors may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. Infrared sensors may be implemented, for example, as microbolometers or other types of thermal imaging infrared sensors arranged in any desired array pattern to provide a plurality of pixels.

The sensor components 342 may further include other sensors capable of sensing characteristics of one or more objects in the environment, such as a radar system, a Lidar system, or other sensor system. Radar and/or Lidar systems are configured to emit a series of pulses or other signals into the scene and detect pulses/signals that are reflected back off of objects in the scene. The components produce signal data representing objects in the scene and corresponding sensor data processing logic 324 is configured to analyze the signal data to identify the location of objects within the scene. Logic device 310 may be adapted to receive captured sensor data from one or more sensors, process captured signals, store sensor data in memory 320, and/or retrieve stored image signals from memory 320.

The communications components 340 include an antenna and circuitry for communicating with other devices using one or more wireless communications protocols. The communication components 340 may be implemented as a network interface component adapted for communication with a network 352, which may include a single network or a combination of multiple networks, and may include a wired or wireless network, including a wireless local area network, a wide area network, a cellular network, the Internet, a cloud network service, and/or other appropriate types of communication networks. The communications components 340 are also configured for direct wireless communications with the control station 350 using one or more wireless communications protocols such as radio control, Bluetooth, WiFi, Micro Air Vehicle Link (MAVLink), and other wireless communications protocols.

GPS 344 may be implemented as a global positioning satellite receiver, a global navigation satellite system (GNSS) receiver, and/or other device capable of determining an absolute and/or relative position of the remote device 300 based on wireless signals received from space-born and/or terrestrial sources, for example, and capable of providing such measurements as sensor signals. In some embodiments, GPS 344 may be adapted to determine and/or estimate a velocity of remote device 300 (e.g., using a time series of position measurements).

The mechanical components 346 include motors, gears, wheels/tires, tracks and other components for moving remote control across the terrain and/or operating physical components of the remote device 300. In various embodiments, one or more of the mechanical components 346 are configured to operate in response to instructions from logic device 310. The remote device 300 includes a housing 348 that protects the various components of remote device 300 from environmental or other conditions as desired.

Figure 4:
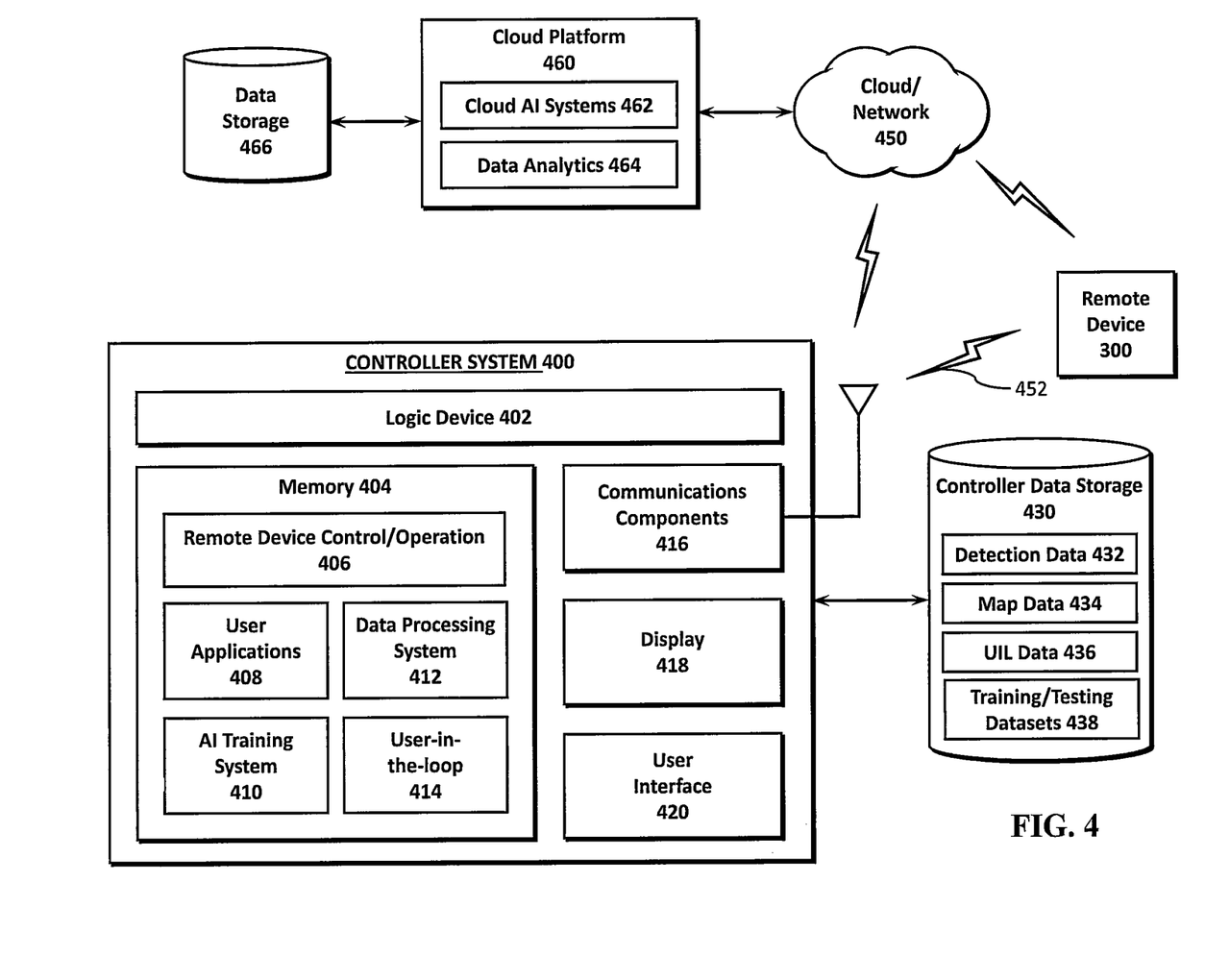
FIG. 4 illustrates an example control station configured for user-in-the-loop processing of object detection data, in accordance with one or more embodiments.

An example controller system for use with remote device 300 will now be described with reference to FIG. 4. A controller system 400 is configured to communicate with remote device 300 across a wireless communications link 452, and/or through a network, such as cloud/network 450, to interface with the remote device 300. In the illustrated embodiment, the controller system 400 includes a logic device 402, a memory 404, communications components 416, display 418 and user interface 420.

The logic device 402 may be include, for example, a microprocessor, a single-core processor, a multi-core processor, a microcontroller, a programmable logic device configured to perform processing operations, a DSP device, one or more memories for storing executable instructions (e.g., software, firmware, or other instructions), a graphics processing unit and/or any other appropriate combination of processing device and/or memory configured to execute instructions to perform any of the various operations described herein. Logic device 402 is adapted to interface and communicate with various components of the controller system including the memory 404, communications components 416, display 418 and user interface 420.

Communications components 416 may include wired and wireless interfaces. Wired interfaces may include communications links with the remote device 300, and may be implemented as one or more physical network or device connect interfaces. Wireless interfaces may be implemented as one or more WiFi, Bluetooth, cellular, infrared, radio, MAVLink, and/or other types of network interfaces for wireless communications. The communications components 416 may include an antenna for communications with the remote device during operation.

Display 418 may include an image display device (e.g., a liquid crystal display (LCD)) or various other types of generally known video displays or monitors. Under interface 420 may include, in various embodiments, a user input and/or interface device, such as a keyboard, a control panel unit, a graphical user interface, or other user input/output. The display 418 may operate as both a user input device and a display device, such as, for example, a touch screen device adapted to receive input signals from a user touching different parts of the display screen.

The memory 404 stores program instructions for execution by the logic device 402 including remote device control/operation instructions 406, user applications 408, AI training system 410, data processing system 412, and user-in-the-loop applications 414. Data used by the controller system 400 may be stored in the memory 404 and/or stored in a separate controller data storage 430. The remote device control and operation instructions 406 facilitate operation of the controller system 400 and interface with the remote device 300, including sending and receiving data such as receiving and displaying a real-time video feed from an image sensor of the remote device 300, transmitting control instructions to the remote device, and other operations desired for a particular implementation. The user applications 408 include system configuration applications, data access and display applications, remote device mission planning applications, and other desired user applications.

The AI training system 410 generates trained AI models for implementation on the remote device 300 and the controller system 400. In some embodiments, one or more aspects of the AI training system 410 may be implemented through a remote processing system, such as a cloud platform 460, that includes cloud AI systems 462, data analytics 464 modules, and data storage 466. In some embodiments, the cloud platform 460 is configured to perform one or more functions of the controller system 400 as described herein. The data processing system 412 is configured to perform processing of data captured by the remote device 300, including viewing, annotating, editing and configuring map information generated by the remote device 300.

The user-in-the-loop applications 414 are configured to facilitate user review, confirmation, refinement, and correction of the object detection data, and improvement to the trained AI models. In some embodiments, the user-in-the-loop applications 414 include processes for accessing object detection data and user-in-the-loop data (e.g., UIL data 436) from the remote device 300 corresponding to periods without communication between the controller system 400 and the remote device 300 (and/or other periods as defined by the system, such as periods associated with object classifications that have a confidence factor below a threshold) and facilitating an interactive display providing the user with a visual representation of the object detection data. In some embodiments, the visual representation includes stored video from before, during, and after detection, display of other sensor data, and display of the object detection data. The user may control the display to focus on desired aspects of the object and/or object detection data and input confirmation on object classification, refinement of object classification data (e.g., manual adjusting object location, manually identifying a point of interest on the object, etc.) and corrections to object classification data. In some embodiments, the object detection and classification data (e.g., detection data 432) may be combined with map data 434 generated by the remote device 300 and/or provided from another source (e.g., through the cloud platform 460). In some embodiments, the display 418 and user interface 420 include a virtual reality headset or similar device allowing the user to interact with the data in a three-dimensional space.

In some embodiments, the user-in-the-loop applications 414 are further configured to generate labeled training data to the AI training system 410 representing corrections and/or refinements to the object detection data generated by one or more trained AI model. In one implementation, user corrections and refinements are provided to the AI training system 410 for consideration in adding to the training and/or testing datasets 438. The AI training system 410 is configured to compare training results with and without the user corrections. If the accuracy of the AI model is determined to be improved by including of the new training data, then the new training data is added to the training dataset and the AI training system 410 generates an updated AI training model to replace the AI object detection model implemented by the remote device 300.

Figure 5A:
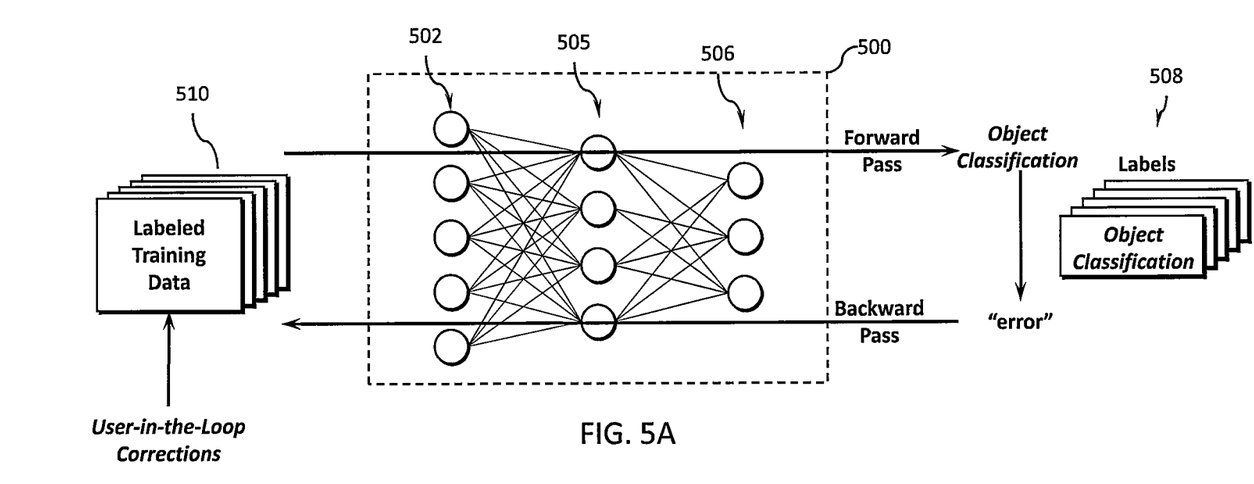
FIG. 5A illustrates an example neural network training process, in accordance with various embodiments of the present disclosure.

Referring to FIG. 5A, an example a neural network that may be used to generate trained AI training models will be described, in accordance with one or more embodiments. The neural network 500 is implemented as a convolutional neural network (CNN) that receives a labeled training dataset 510 to produce object detection information 508 for each data sample. The training dataset represents captured sensor data associate with one or more types of sensors, such as infrared images, visible light images, radar signal data, Lidar signal data, GPS data, and/or other data used by the remote device 300. For object classification in images, the images may comprise a region of interest from a captured image that includes an object to be identified.

Figure 5B:
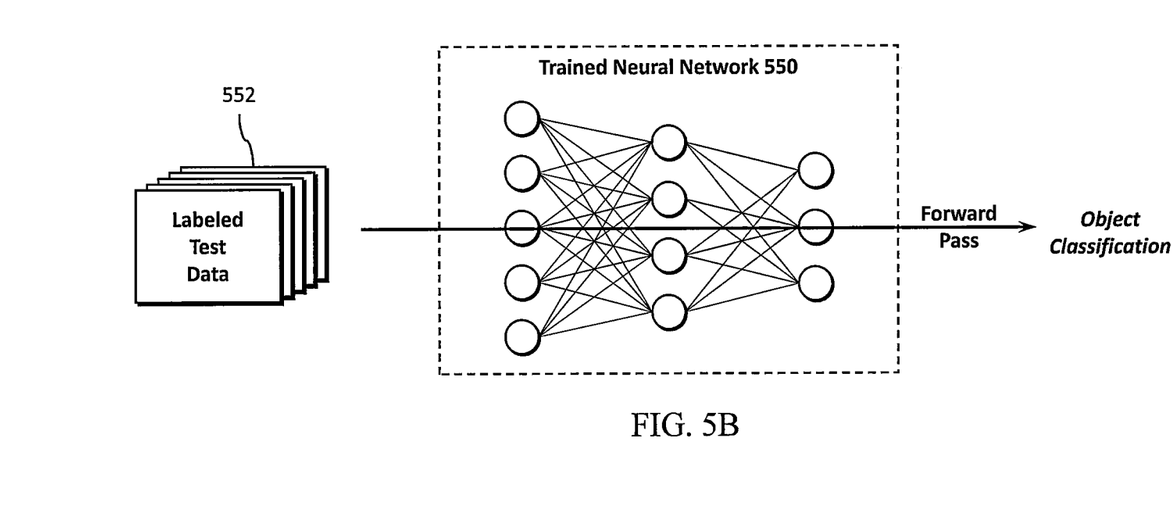
FIG. 5B illustrates a validation process for the neural network of FIG. 4A, in accordance with various embodiments of the present disclosure.

The training includes a forward pass through the neural network 500 to produce object detection and classification information, such as an object location, an object classification, and a confidence factor in the object classification. Each data sample is labeled with the correct classification and the output of the neural network 500 is compared to the correct label. If the neural network 500 mislabels the input data, then a backward pass through the neural network 500 may be used to adjust the neural network to correct for the misclassification. Referring to FIG. 4B, a trained neural network 550, may then be tested for accuracy using a set of labeled test data 552. The trained neural network 550 may then be implemented in a run time environment of the remote device to detect and classify objects.

Figure 6:
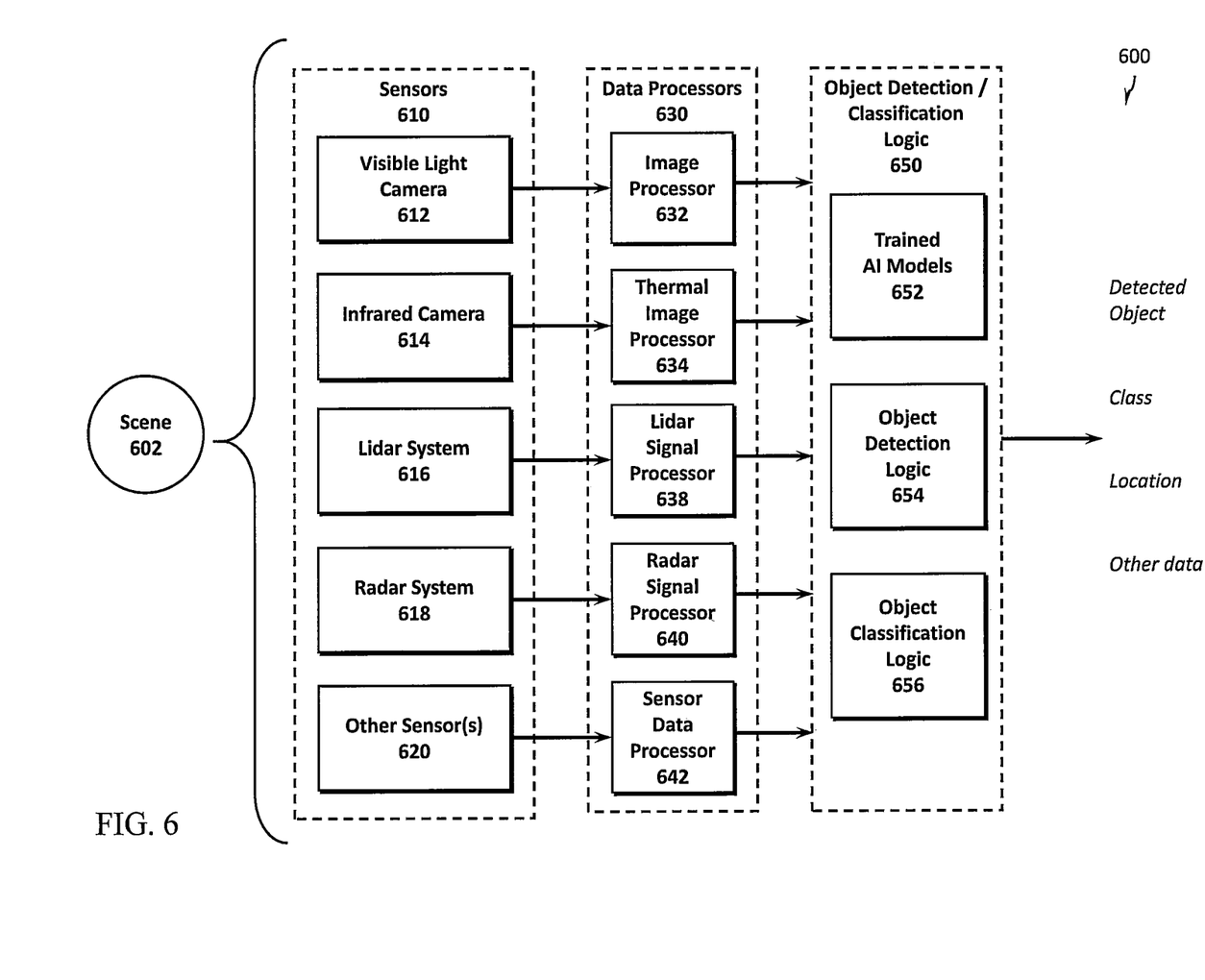
FIG. 6, illustrates an example object detection system for use in a remote device, in accordance with one or more embodiments.

Referring to FIG. 6, an example object detection system for use in a remote device will now be described, in accordance with one or more embodiments. The object detection system 600 may be implemented in a remote device as described herein. The object detection system 600 includes a plurality of sensors 610 configured to sense objects in the scene 602, a plurality of data processors 630 configured to receive the sensor data and transform the raw data into form that is useable by the system 600, and object detection classification logic 650 configured to detect objects, classify objects and provide an associated confidence factor, determine an object location, and/or produce other desired object data.

The sensors 610 may include any sensor or device that is capable of sensing environmental data related to the scene 602 and producing corresponding data that assists in generating desired object information. In the illustrated embodiment, the sensors include a visible light camera 612, an infrared camera 614, a Lidar system 616, a radar system 618 and other sensors 620. Each of the sensors 610 produces raw data that is transformed using appropriate data processing components into a format that useable by the object classification system. In the illustrated embodiment, for example, the data processors 630 include an image processor 632, a thermal image processor 634, a Lidar signal processor 638, a radar signal processor 640, and a sensor data processor 642 which corresponds to another sensor type, as needed. In one or more embodiments, the data processors 630, may perform addition data manipulation, including feature extraction for input into the object detection and classification logic 650.

The object detection and classification logic 650 includes one or more trained AI models 652 and (as needed) object detection logic 654 and object classification logic 656 to perform additional object detection and classification operations that are more efficiently and/or more accurately performed outside of the trained AI models 652. For example, object detection for some sensor types may be performed using background learning algorithms, motion detection algorithms, and other known algorithms. In various embodiments, the data from individual sensors may be processed separately (e.g., through separate trained AI models) and/or data from two or more sensors be combined through a fusion processor to produce a single classification.

Figure 7:
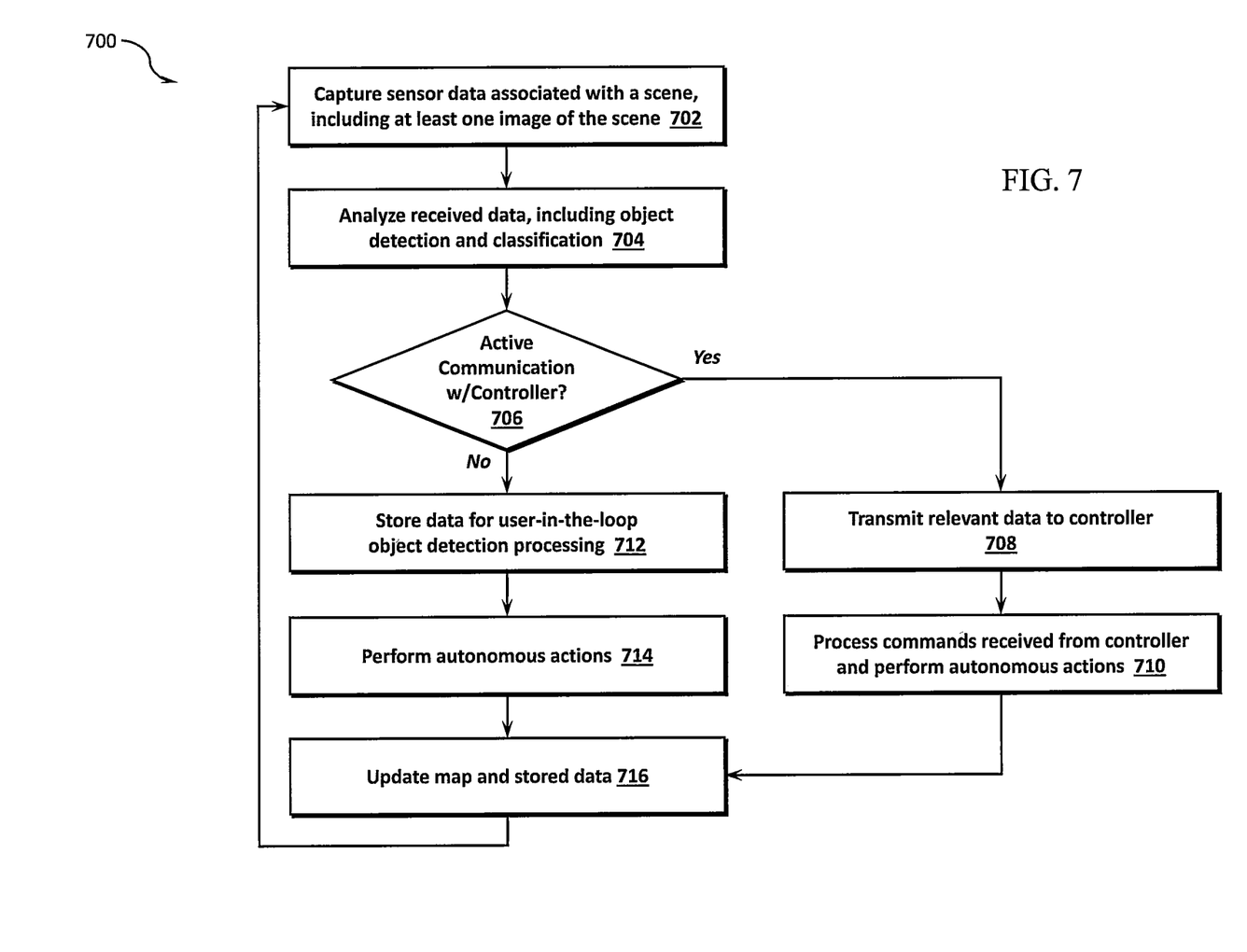
FIG. 7 illustrates an example operation of object detection and classification in a remote device using user-in-the-loop processing, in accordance with one or more embodiments.

Referring to FIG. 7, an example operation of object detection and classification in a remote device using user-in-the-loop processing will now be described in accordance with one or more embodiments. An object detection and classification process 700 starts by capturing sensor data associated with a scene, in step 702. The data includes at least one image of all or part of the scene to facilitate user review and correction of object detection data. Next, in step 704, the system analyzes the received sensor data and performs object detection and classification. If there are active communications with a control station (step 706), then relevant data is transmitted to the control station for real-time monitoring by the user. For example, a live video feed may be sent to the controller, allowing the user to provide real-time control of the remote device. Similarly, the remote device processes commands and data received from the controller, in step 710. The remote device also performs autonomous actions as required. The remote device updates its map and stored data in step 716 to capture relevant data captured or detected by the remote device.

Referring back to step 706, if there is not active communication with the controller (e.g., if the remote device is out of range), then the remote device stores data for use in user-in-the-loop object detection processing (step 712) after communications have been reestablished with the control station. The stored data may include storing a stream of sensor data from a period prior to object detection through a period after object detection, including recorded video of the object detection, and other data as appropriate. The remote device then performs autonomous actions in accordance with its mission (step 714). The map and stored data are updated as needed in order to capture relevant data captured or detected by the remote device (step 716)

Figure 8:
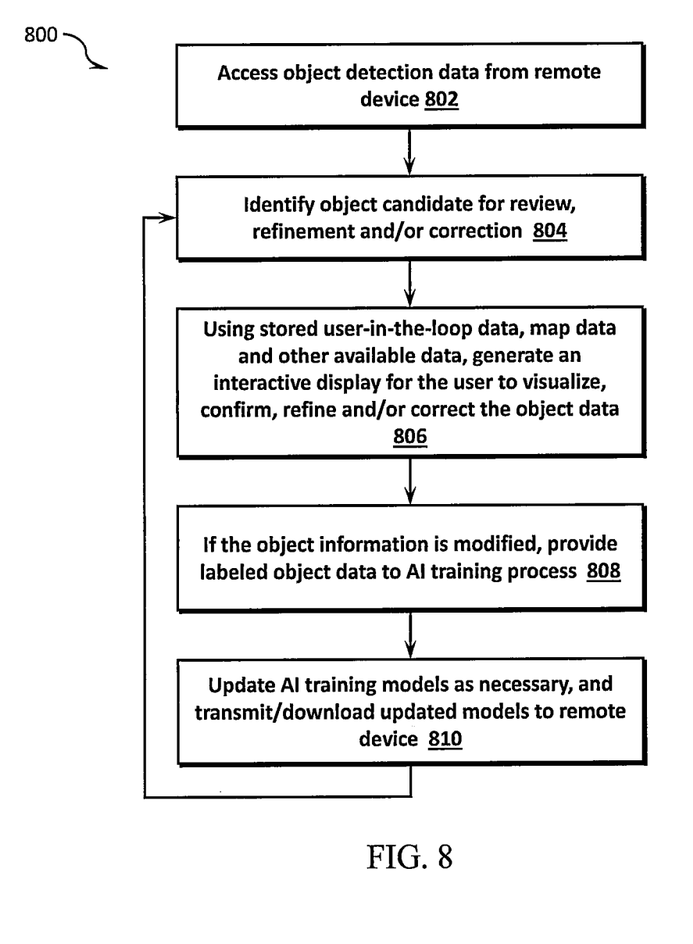
FIG. 8 illustrates an example operation of object detection and classification in a control system using user-in-the-loop processing, in accordance with one or more embodiments.

Referring to FIG. 8, an example operation of object detection and classification in a control system using user-in-the-loop processing will now be described in accordance with one or more embodiments. A user-in-the-loop process 800 starts by accessing object detection data from the remote device, in step 802. This step may take place during a time when the remote device is in range for communications, when the remote device returns home, through a network, or through another method. Next, the controller identifies object candidates for review, refinement and/or correction, in step 804. In some embodiments, the controller tracks the time when the remote device is out of range and identifies corresponding activity. The remote device may identify activity associated with periods without communication by tracking time periods without communication, tagging data acquired during the period without communication, and/or through other approaches suitable for identifying the relevant data. In some embodiments, the remote device may identify other objects for review, such as detected objects that have a low (e.g., compared to a threshold) classification confidence.

In step 806, the controller generated an interactive display to aid the user in visualizing, confirming, refining, and/or correcting the object data. The display is generated using the user-in-the-loop data stored by the remote device, map data generated by the remote device and other available data (e.g., GPS data, satellite images, etc.). In some embodiments, the display includes a video of the object detection with controls (e.g., pause, forward, back, zoom) to provide the user the ability for focus on areas of interest. The display may further include sensor data or other data generated by the remote device (e.g., active radar data associated with the detection), and user input features for identifying areas of interest or inputting corrected classifications and data values. In some embodiments, the display includes a virtual reality environment (e.g., accessible using a VR headset) allowing the user to virtually traverse the map and explore the detected object.

If the object detection data is modified, the controller may prepare a labeled data sample, including the sensor data and correct classification information, for use by the AI training process, in step 808. In some embodiments, the controller is configured to identify the types of modifications that should be forwarded, such as object misclassifications, and which types of modifications should be ignored in AI training (e.g., slight adjustment to an object location). In step 810, the controller updates the AI training models as appropriate and downloads the updated trained AI models to the remote device. In one embodiment, the AI training system tests new trained data samples received through the user-in-the-loop process to determine whether the new sample will improve or reduce the accuracy of the trained AI model. If a determination is made to add the sample to the training dataset, the AI training system generates a new trained AI model and downloads it to the remote device.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a detection logic device configured to:

detect and classify an object in sensor data at an unmanned device, wherein the unmanned device comprises an unmanned ground vehicle (UGV), and unmanned aerial vehicle (UAV), and/or an unmanned marine vehicle (UMV);

generate and store object analysis information for a user of a control system, wherein the object analysis information facilitates user detection and classification of the detected object; and a second logic device configured to:
receive real-time communications from the unmanned device relating to the detected object;
access the stored object analysis information during a period when the unmanned device is in a communication range of the control system;
display at least a portion of the object analysis information for the user to facilitate detection and classification of the detected object by the user;
update object detection information in accordance with user input;
generate a training data sample from the updated object detection information for use in training an object classifier;
retrain the object classifier using a dataset that includes the training data sample; and
determine whether to replace a trained object classifier with the retrained object classifier, determination based at least in part on a comparative accuracy of the trained object classifier and the retrained object classifier in classifying a test dataset.

2. The system of claim 1, wherein the unmanned device further comprises a sensor configured to generate the sensor data, the sensor comprising a visible light image sensor, an infrared image sensor, a radar sensor, and/or a Lidar sensor.

3. The system of claim 1, wherein the detection logic device is further configured to execute a trained neural network configured to receive a portion of the sensor data and output a location of the object in the sensor data and the classification for the object.

4. The system of claim 3, wherein the trained neural network is configured to generate a confidence factor associated with the classification.

5. The system of claim 1, further comprising the control system, wherein the control system is configured to facilitate user monitoring and/or control of the unmanned device during operation and comprises:
a display screen configured to display at least the portion of the object analysis information; and
a user interface configured to receive the detection and the classification of the detected object.

6. The system of claim 1, wherein the second logic device is further configured to:
download the retrained object classifier to the unmanned device to replace the trained object classifier; and
add the training data sample to a training dataset.

7. The system of claim 1, wherein the detection logic device is further configured to construct a map based on generated sensor data.

8. The system of claim 1, wherein the unmanned device is adapted to traverse a search area and generate the sensor data associated with one or more objects that may be present in the search area.

9. A method comprising:
operating an unmanned device, wherein the unmanned device comprises an unmanned ground vehicle (UGV), and unmanned aerial vehicle (UAV), and/or an unmanned marine vehicle (UMV);
detecting and classifying an object in sensor data sensed at the unmanned device;
generating and storing object analysis information for a user of a control system, wherein the object analysis information is generated to facilitate user detection and classification of the detected object;
receiving real-time communications from the unmanned device relating to the detected object;
accessing the stored object analysis information during a period when the unmanned device is in communication range of the control system;
displaying at least a portion of the object analysis information for the user to facilitate detection and classification of the detected object by the user;
updating object detection information in accordance with user input;
generating a training data sample from the updated object detection information for use in training an object classifier;
retraining the object classifier using a dataset that includes the training data sample; and
determining whether to replace a trained object classifier with the retrained object classifier, determination based at least in part on a comparative accuracy of the trained object classifier and the retrained object classifier in classifying a test dataset.

10. The method of claim 9, further comprising:
generating the sensor data comprising a visible light image, an infrared image, a radar signal, and/or a Lidar signal.

11. The method of claim 9, further comprising:
receiving, at a neural network, a portion of the sensor data, an output a location of the detected object in the sensor data, and the classification for the detected object; and
generating, at the neural network, a confidence factor associated with the classification.

12. The method of claim 9, further comprising:
downloading the retrained object classifier to the unmanned device to replace the trained object classifier; and
adding the training data sample to a training dataset.

13. The method of claim 9, further comprising constructing a map based on generated sensor data.

14. The method of claim 9, wherein the operating the unmanned device further comprises operating the unmanned device to traverse a search area and generate the sensor data associated with one or more objects that may be present in the search area.

15. A non-transitory computer-readable medium having instructions stored thereon, that when executed by a processor cause the processor to perform operations, the operations comprising:
operating an unmanned device, wherein the unmanned device comprises an unmanned ground vehicle (UGV), and unmanned aerial vehicle (UAV), and/or an unmanned marine vehicle (UMV);
detecting and classifying an object in sensor data sensed at the unmanned device;
generating and storing object analysis information for a user of a control system, wherein the object analysis information is generated to facilitate user detection and classification of the detected object;
receiving real-time communications from the unmanned device relating to the detected object;

accessing the stored object analysis information during a period when the unmanned device is in communication range of the control system;

updating object detection information based on the object analysis information;

generating a training data sample from the updated object detection information for use in training an object classifier;

retraining the object classifier using a dataset that includes the training data sample; and determining whether to replace a trained object classifier with the retrained object classifier, determination based at least in part on a comparative accuracy of the trained object classifier and the retrained object classifier in classifying a test dataset.

16. The non-transitory computer-readable medium of claim 15, further comprising:

generating the sensor data comprising a visible light image, an infrared image, a radar signal, and/or a Lidar signal.

17. The non-transitory computer-readable medium of claim 15, further comprising:

receiving, at a neural network, a portion of the sensor data, an output a location of the detected object in the sensor data, and the classification for the detected object; and generating, at the neural network, a confidence factor associated with the classification.

18. The non-transitory computer-readable medium of claim 15, further comprising:

downloading the retrained object classifier to the unmanned device to replace the trained object classifier; and adding the training data sample to a training dataset.

19. The non-transitory computer-readable medium of claim 15, further comprising:

constructing a map based on generated sensor data.

20. The non-transitory computer-readable medium of claim 15, further comprising:

operating the unmanned device to traverse a search area and generate the sensor data associated with one or more objects that may be present in the search area.

* * * * *